United States Patent
He et al.

(10) Patent No.: US 10,530,867 B2
(45) Date of Patent: Jan. 7, 2020

(54) SOFTWARE-DEFINED NETWORKING PROXY GATEWAY

(71) Applicant: International Business Machines Corporation, Armonk, NY (US)

(72) Inventors: Guo Xing He, Suzhou (CN); Shi X. Ruan, Wuxi (CN); Gang Tang, Nanjing (CN); Na Zhu, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 15/437,004

(22) Filed: Feb. 20, 2017

(65) Prior Publication Data

US 2018/0241824 A1     Aug. 23, 2018

(51) Int. Cl.
*H04L 29/08* (2006.01)
*H04L 12/46* (2006.01)

(52) U.S. Cl.
CPC ........ *H04L 67/141* (2013.01); *H04L 12/4633* (2013.01); *H04L 12/4641* (2013.01); *H04L 67/10* (2013.01); *H04L 67/28* (2013.01)

(58) Field of Classification Search
CPC ....... H04L 67/10; H04L 67/141; H04L 67/28; H04L 61/103; H04L 61/2521; H04L 12/4633; H04L 12/4641; H04L 41/0803; G06F 9/45558; G06F 2009/45595
USPC .......................................................... 709/228
See application file for complete search history.

(56) References Cited

U.S. PATENT DOCUMENTS

| | | | |
|---|---|---|---|
| 9,225,641 B2 | 12/2015 | Kaneriya et al. | |
| 2013/0287026 A1* | 10/2013 | Davie | H04L 49/70 370/392 |
| 2014/0133456 A1 | 5/2014 | Donepudi et al. | |
| 2014/0307744 A1 | 10/2014 | Dunbar et al. | |
| 2015/0043576 A1* | 2/2015 | Dixon | H04L 12/184 370/390 |

(Continued)

OTHER PUBLICATIONS

WWT, "software-defined networking guide," Sep. 2015, World Wide Technology, Inc, web.archive.org/web/20150930050249/https://www2.wwt.com/wp-content/uploads/2015/06/White-Paper-SDN-Solution-Guide.pdf (Year: 2015).*

(Continued)

*Primary Examiner* — Ruolei Zong
(74) *Attorney, Agent, or Firm* — Nicholas D. Bowman; Hunter E. Webb; Keohane & D'Alessandro PLLC

(57) ABSTRACT

Aspects of the present invention provide an approach for improving communications between a software-defined networking (SDN) controller and a hardware gateway in a SDN. In an embodiment, a SDN proxy gateway is installed. The SDN proxy gateway communicates with the SDN controller on behalf of the hardware gateway. To accomplish this, the SDN proxy gateway processes a communication sent from the SDN controller to the hardware gateway. This communication includes a request from a computing node to establish a network communication channel. The SDN proxy gateway translates these instructions (e.g., the logical network and endpoint information), which are in the native format of the SDN controller, into a standardized hardware gateway protocol. The translated information that the hardware gateway can use to establish the network connection is then pushed to the hardware gateway by the proxy gateway.

20 Claims, 8 Drawing Sheets

(56) References Cited

U.S. PATENT DOCUMENTS

| | | | | |
|---|---|---|---|---|
| 2015/0100560 A1* | 4/2015 | Davie | ................... | H04L 45/16 |
| | | | | 707/703 |
| 2016/0006642 A1* | 1/2016 | Chang | ................... | H04L 45/02 |
| | | | | 370/252 |
| 2016/0234067 A1* | 8/2016 | Dolganow | .......... | H04L 41/0813 |
| 2016/0330076 A1* | 11/2016 | Tiwari | ............... | H04L 41/0806 |
| 2016/0380812 A1* | 12/2016 | Chanda | .............. | H04L 41/0803 |
| | | | | 709/220 |

OTHER PUBLICATIONS

Maksim Sisov, "Building a Software-Defined Networking System with OpenDaylight Controller," 2016, Helsinki Metropolia University of Applied Sciences, www.theseus.fi/bitstream/handle/10024/106477/SDN_MAKSIM_SISOV.pdf (Year: 2016).*

Giada Landi et al., "Combining Optics and SDN in next Generation data centre Networks," 2015, COSIGN, cordis.europa.eu/docs/projects/cnect/2/619572/080/deliverables/001-619572CONSIGND32renditionDownload.pdf (Year: 2015).*

Puype, Bart, "Enabling SDN Experimentation in Wireless Testbeds exploiting Future Internet Infrastructure in South Korea & Europe", SmarFIRE, Aug. 31, 2014, 17 pgs.

Ahmed, Reaz et al., "Design Considerations for Managing Wide Area Software Defined Networks", IEEE Communications Magazine, Jul. 2014 8 pgs.

* cited by examiner

SOFTWARE-DEFINED NETWORKING PROXY GATEWAY

TECHNICAL FIELD

The subject matter of this invention relates generally to network communications. More specifically, aspects of the present invention provide a solution for improved software-defined networking (SDN) communications in using a proxy gateway in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs simultaneously.

However, the many VMs can sometimes provide challenges for the hardware on which they operate. For example, if a large number of VMs were simultaneously to utilize the hardware controller of a physical server that facilitates communications with the outside network, the controller might be overwhelmed. To remedy this problem, solutions have been developed. One such solution is software-defined networking (SDN). SDN virtualizes network communications so that one or more hardware devices can be utilized as a SDN gateway. In operation, these hardware devices are not utilized directly by individual VMs, which can allow multiple VMs to create a network connection through a single SDN gateway device.

To this extent, in many SDN solutions, the hardware gateway is a very important component for connecting the tenant network (e.g., the VMs in the remote server) to a traditional network (e.g., a wide area network, local area network, the Internet, etc.). To accomplish this, the hardware gateway will receive endpoint information that is pushed to it by the SDN controller. Upon receiving this information, the hardware gateway will generally build the data path to the hypervisor on which the virtual server is running (e.g., using a Virtual eXtensible Local Area Network (VXLAN) tunnel).

SUMMARY

In general, aspects of the present invention provide an approach for improving communications between a software-defined networking (SDN) controller and a hardware gateway in a SDN. In an embodiment, a SDN proxy gateway is installed. The SDN proxy gateway communicates with the SDN controller on behalf of the hardware gateway. To accomplish this, the SDN proxy gateway processes a communication sent from the SDN controller to the hardware gateway. This communication includes a request from a computing node to establish a network communication channel. The SDN proxy gateway translates these instructions (e.g., the logical network and endpoint information), which are in the native format of the SDN controller, into a standardized hardware gateway protocol. The translated information that the hardware gateway can use to establish the network connection is then pushed to the hardware gateway by the proxy gateway.

One aspect of the invention provides a software-defined networking (SDN) communication system. The system comprises a server computer system in a networked computing environment; a plurality of computing nodes operating within the server system; a hardware gateway that connects the server computer system to a network, a SDN controller; and a SDN proxy gateway, having: a SDN controller driver that processes a communication between the SDN controller and the hardware gateway, the communication including a request from a computing node of the plurality of computing nodes to establish a connection to the network; a SDN proxy gateway translator that transforms instructions within the communication that are in a first format of the SDN controller into translated instructions for a standardized hardware gateway protocol; and a SDN gateway driver that pushes the translated instructions for establishing the connection to the network to the hardware gateway. This system offers several advantages, such as, but not limited to, enabling communications with a hardware gateway by an SDN controller that might otherwise not be able to communicate with the particular type of hardware gateway.

The system may optionally further comprise instructions that include logical network information and endpoint information. These techniques enable, for example, the ability to convert logical network information and endpoint information from various sources.

The system may optionally further comprise, in the controller driver, a set of logical application programmer interfaces (APIs) for logical network configurations corresponding to different types of SDN controllers, and a driver manager that manages a plurality of different drivers and selects a proper driver to communicate with the SDN controller. These techniques enable, for example, the ability to establish communications with SDN controllers of different types.

The system may optionally further comprise, in the SDN gateway translator, an L2 gateway translator that bridges a SDN network with a physical LAN network; and an L3 gateway translator that provides routing between subnets in the SDN network and subnets in the physical LAN network. These techniques enable, for example, the ability to translate both L2 and L3 communications.

The system may optionally further comprise, in the gateway driver, a set of physical network APIs for physical network configurations corresponding to different types of hardware gateways, and a hardware driver manager that manages a plurality of different hardware drivers and selects a proper hardware driver to communicate with the hardware gateway. These techniques enable, for example, the ability to establish communications with hardware gateways of different types.

The system may optionally further comprise, a connection establisher that establishes, in response to the receipt of the translated instructions, the connection to the network by building a direct data path from the hardware gateway to a hypervisor on which the computing node is running, wherein the direct data path is a Virtual eXtensible Local Area Network (VXLAN) tunnel. These techniques enable, for example, the ability to establish a direct data path between the hardware gateway and hypervisor.

The system may optionally further comprise a networked computing environment that is a cloud computing environment, wherein the computing node is a cloud resource selected from a group, comprising: a virtual machine instance and a container virtual machine. These techniques enable, for example, the ability to establish a communication for a cloud resource in a cloud computing environment.

Another aspect of the invention provides a method for establishing a software-defined networking (SDN) connection to a network in a networked computing environment, comprising: processing a communication between a SDN controller and a hardware gateway, the communication including a request from a computing node of a plurality of computing nodes on a server computer system to establish a connection to the network; transforming instructions within the communication that are in a first format of the SDN controller into translated instructions for a standardized hardware gateway protocol; and pushing the translated instructions for establishing the connection to the network to the hardware gateway.

Yet another aspect of the invention provides a computer program product embodied in a computer readable medium that, when executed by a computer device, performs a method for establishing a software-defined networking (SDN) connection to a network in a networked computing environment, the method comprising: processing a communication between a SDN controller and a hardware gateway, the communication including a request from a computing node of a plurality of computing nodes on a server computer system to establish a connection to the network; transforming instructions within the communication that are in a first format of the SDN controller into translated instructions for a standardized hardware gateway protocol; and pushing the translated instructions for establishing the connection to the network to the hardware gateway.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
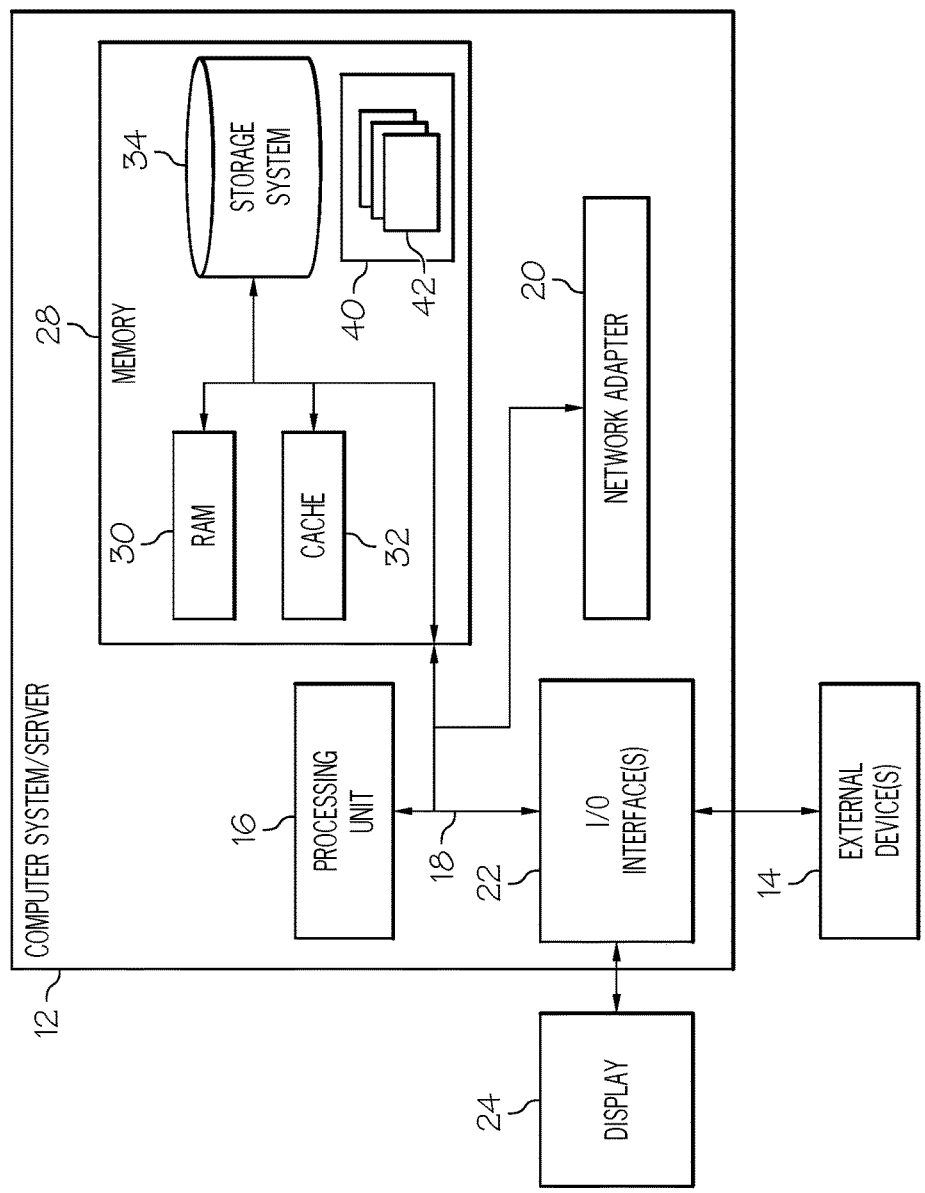
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for improving communications between a software-defined networking (SDN) controller and a hardware gateway in a SDN. In an embodiment, a SDN proxy gateway is installed. The SDN proxy gateway communicates with the SDN controller on behalf of the hardware gateway. To accomplish this, the SDN proxy gateway processes a communication sent from the SDN controller to the hardware gateway. This communication includes a request from a computing node to establish a network communication channel. The SDN proxy gateway translates these instructions (e.g., the logical network and endpoint information), which are in the native format of the SDN controller, into a standardized hardware gateway protocol. The translated information that the hardware gateway can use to establish the network connection is then pushed to the hardware gateway by the proxy gateway.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
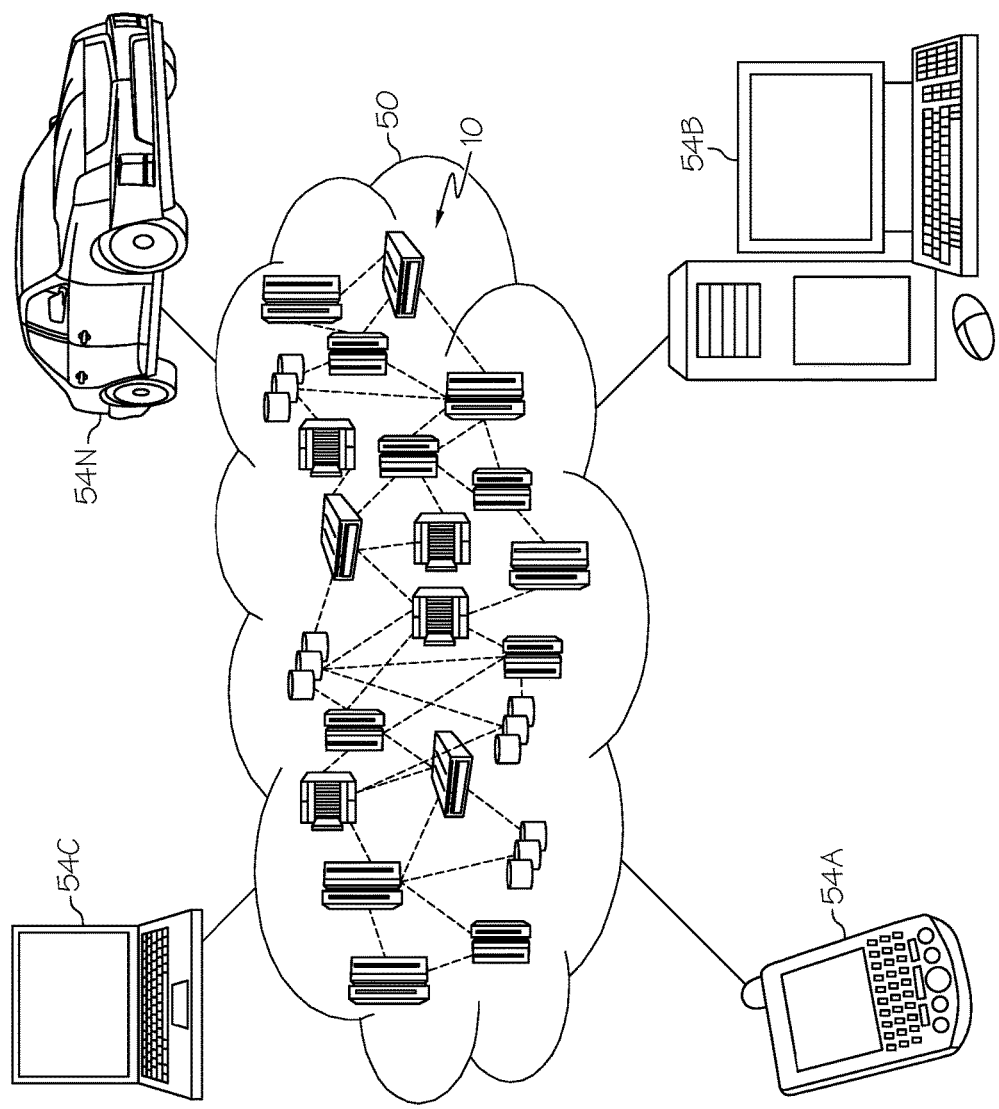
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
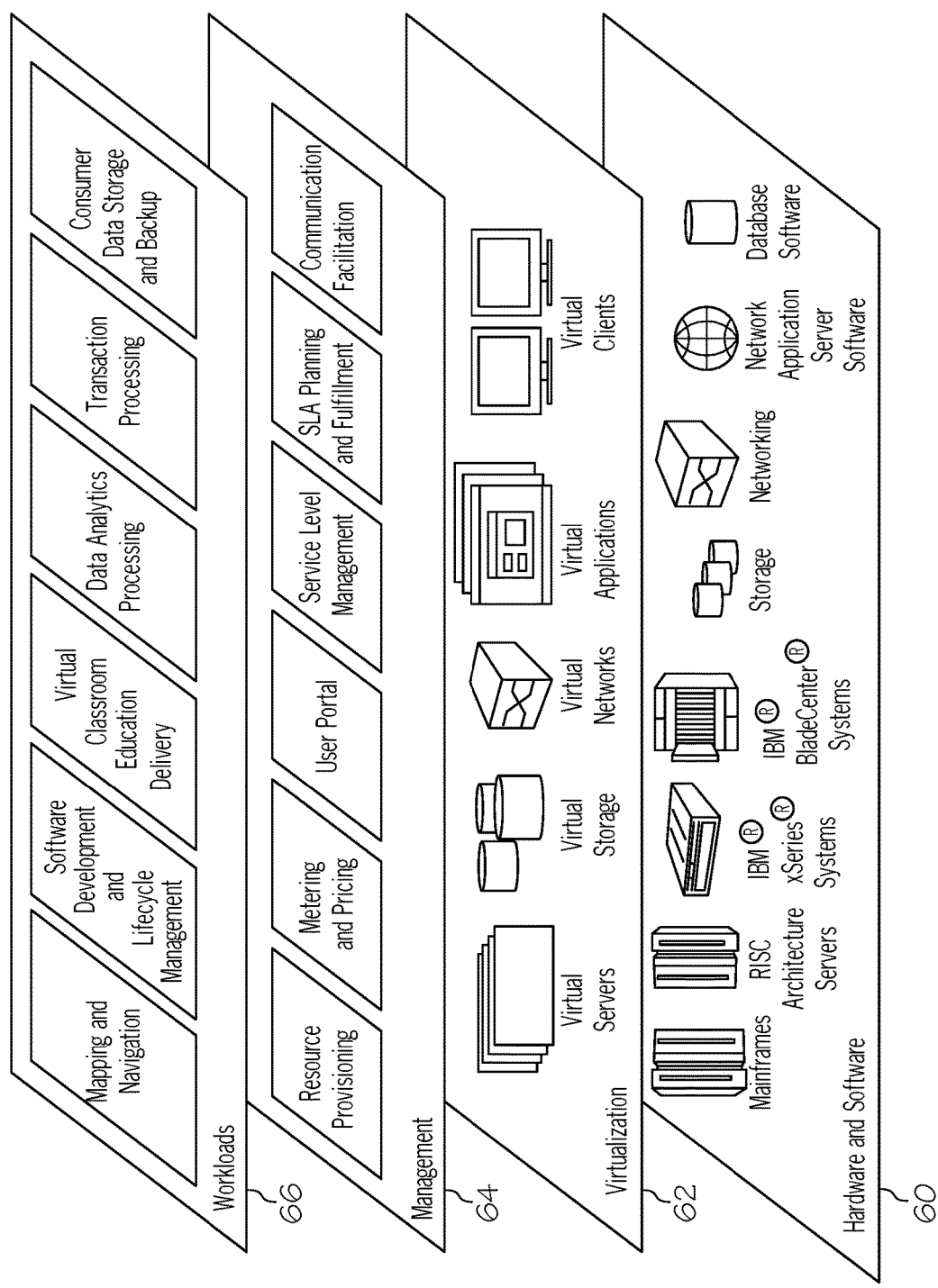
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is communication facilitation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
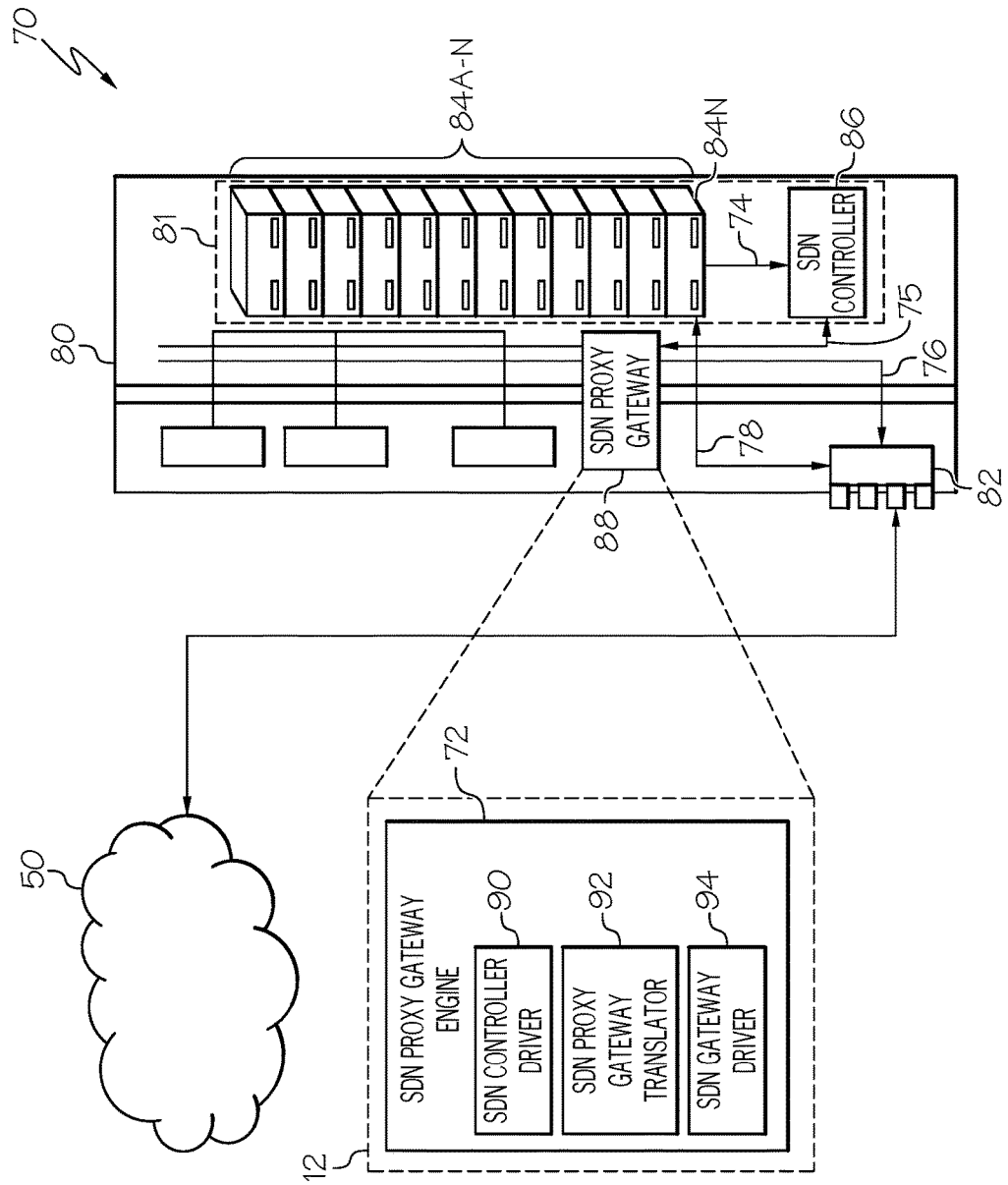
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 4 for illustrative purposes only. In the event the teachings recited herein are practiced in a networked computing environment 70, each physical server 80 need not have a SDN proxy gateway engine (hereinafter "system 72"). Rather, system 72 could be loaded on a server or server-capable device that communicates (e.g., wirelessly) with the physical server 80 to provide SDN communications therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can facilitate a SDN connection for one or more computing nodes 84N of a plurality of computing nodes 84A-N on server 80 in a networked computing environment 70. To accomplish this, system 72 can include: a SDN controller driver 90, a SDN proxy gateway translator 92, and a SDN gateway driver 94.

As shown, server 80 can host and/or provide a SDN connection for a number of computing nodes 84A-N. One or more of computing nodes 84A-N can be or include a traditional virtual machine (VM) instance. Such a VM instance can be included in a computing node 84N as a virtual server on physical server 80. It should be understood that a VM instance is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, a VM instance is a virtual system that simulates an entire computing environment. To this extent, rather than performing only a single task, a VM instance is an environment, can include an operating system, middleware, one or more applications, and/or the like, within which a variety of tasks, functions, operations, etc., can be carried out by a user, such as by executing one or more applications thereon. As such, a VM instance can be made to simulate a stand-alone computer system in the eyes of a user.

To this extent, in a VM instance-type environment, server 80 can includes a virtualization hypervisor 81 at the lowest level. Virtualization hypervisor 81 can run directly on the physical server 80, referred to as a bare metal (BM) configuration, or, alternatively, can run on a server operating system running on the physical server 80. In any case, virtualization hypervisor 81 provides a platform that allows multiple "guest" virtual server 84A-N systems to run concurrently on the physical server 80. To this extent, virtualization hypervisor 81 provides an abstraction level between the hardware level of physical server 80 and the higher level software functions of each virtual server 84N. In order to provide these software functions, each virtual server-based computing node 84N can contain everything that is necessary to simulate a "guest" instance of a particular virtual server on physical server 80 via virtualization hypervisor 81. To this extent, computing node 84N includes an operating system, middleware, one or more applications and/or the like.

Additionally or in the alternative, one or more of computing nodes 84A-N can be or include a container virtual machine (VM) such as may be found in the container-based networked computing environment. Unlike with traditional VM instances, a container VM does not include a virtualization hypervisor 81 at the lowest level. Rather, in a container-based networked computing environment, an operating system runs directly in a bare metal (BM) configuration on the physical server 80 and one or more containers run on the same operating system. As with a VM instance, containers can each provide middleware, one or more applications, and/or the like. However, because the operating system is running in a BM configuration, no operating system need be included within the computing node 84A-N itself. This allows any container to be made operational more quickly than a traditional hypervisor-based VM instance, while still maintaining the functional independence and other characteristics thereof.

In any case, to provide a network connection to network 50 for computing nodes 84A-N, physical server 80 can include a hardware gateway 82. Hardware gateway 82 is a hardware communications device that establishes the routing protocols between the physical server 80 and the network 50. However, a large number of computing nodes 84A-N running on a single physical server 80 can sometimes provide challenges for hardware gateway 82. For example, if a large number of computing nodes 84A-N were simultaneously to try to directly utilize hardware gateway 82 of physical server 80 that facilitates communications with outside network 50, the hardware gateway 82 might be overwhelmed. To remedy this problem, solutions have been developed. One such solution is software-defined networking (SDN). SDN utilizes a SDN controller 86, which virtualizes network communications so that hardware gateway(s) 82 are not utilized directly by individual computing nodes 84N, allowing multiple computing nodes 84A-N to establish a connection with network 50. All or portions of SDN controller 86 can be included within hypervisor 81 or can be executed on BM physical server 80 (e.g., within or on top of the BM OS). Additionally, or in the alternative, all or portions of SDN controller 86 can be included within hypervisor 81, for example, as a stand-alone utility, as a component of computing node 84N, and/or as a stand-alone computing node 84N on physical server 80, as further described in U.S. patent application Ser. No. 14/946,948.

As stated above, to accomplish this, a traditional hardware gateway 82 will receive endpoint information that is pushed to it by a SDN controller 86. Upon receiving this information, the hardware gateway will generally build the data path to the hypervisor on which the virtual server is running (e.g., using a Virtual eXtensible Local Area Network (VXLAN) tunnel).

The inventors of the invention described herein have discovered certain deficiencies in the current solutions for facilitating a SDN connection. For example, different SDN controllers 86 in existence today use proprietary protocols and syntax to exchange control messages with the hardware gateway 82 that often differ from one another. As it is difficult, if not impossible, for each hardware gateway 82 to support all SDN controllers 86, the protocols used by certain SDN controllers 86 may not be compatible with the hardware gateway 82 that is being used in conjunction with certain physical servers 80, which can necessitate having to forgo using the SDN controller 86 or to replace the hardware gateway 82, physical server 80, or both. This also limits the choices available to the user, as the user may not be able to pick both the hardware gateway 82 and SDN controller 86 that the user wants, especially if they do not come from the same source. This is further complicated by the fact that a hardware gateway 82 may, in addition to communications from the SDN controller 86, need to be able to process messages from traditional routers and switches, further increasing the development time and cost. Additionally, any updates to a SDN controller 86 or improved SDN controller 86 releases, which may be frequent, may not be supported by particular hardware gateways, which, as they are hardware components, often have longer lifecycles.

Certain embodiments of the present invention may offer various technical computing advantages, including increased interoperability between SDN controllers 86 and hardware gateways 82, which may not have been compatible under previous solutions. To this extent, most any SDN controller 86 can be used with most any hardware gateway 82 using the teachings of the current invention. Further, certain embodiments of the present invention increase the longevity of physical servers 80 and their associated hardware gateways 82, saving time and resources.

Some or all of these advantages, as well as others, are realized by the installation of a SDN proxy gateway 88 that incorporates the components of system 72 on physical server 80. SDN proxy gateway 88 can include a stand-alone hardware solution that includes system 72. Alternatively, SDN proxy gateway 88 can be a software solution that operates within the framework of physical server 80. To this extent, all or portions of SDN proxy gateway 88 can be included within hypervisor 81 or can be executed on BM physical server 80 (e.g., within or on top of the BM OS). Additionally, or in the alternative, all or portions of SDN proxy gateway 88 can be included within hypervisor 81, for example, as a stand-alone utility, as a component of computing node 84N, and/or as a stand-alone computing node 84N on physical server 80. In any case, SDN proxy gateway 88 acts as an intermediary between SDN controller 86 and hardware gateway 82, communicating with SDN controller 86 on behalf of hardware gateway 82 and vice-versa, as will be explained in more detail. Referring again to FIG. 4, SDN controller driver 90 of system 72, as included in proxy gateway 88 and executed by computer system/server 12, is configured to process a communication 75 between SDN controller 86 and hardware gateway 82. For example, in previous solutions, when a computing node 84N needs to establish a connection with network 50, computing node 84N sends a request to SDN controller 86. In such solutions, SDN controller 86 virtualizes the request from computing node 84N and sends a communication 75 to hardware gateway 82 to establish the connection with network 50. Under the current invention, proxy gateway 88 processes this communication 75 from SDN controller 86 to hardware gateway 82.

Figure 5:
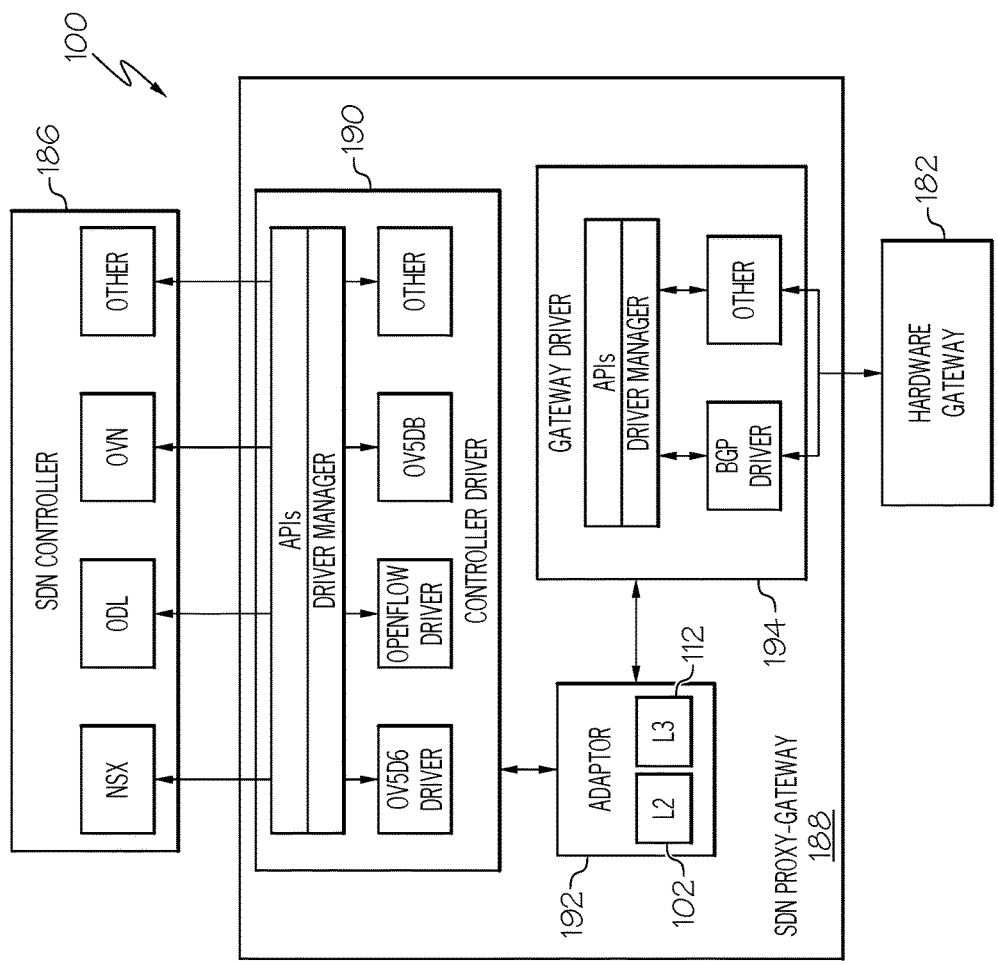
FIG. 5 depicts an example component diagram according to an embodiment of the present invention.

Referring now to FIG. 5, an example component diagram 100 is shown according to embodiments of the invention. As shown, component diagram 100 includes a SDN controller 186, a hardware gateway 182, and a SDN proxy gateway 188. As also shown in FIG. 4, SDN proxy gateway 188 includes a controller driver 190, a communication translator 192, and a gateway driver 194. Controller driver 190 includes a set of application programmer interfaces (APIs) with which controller driver 190 can communicate SDN controller 186. These APIs enable controller driver 190 to communicate with a plurality of SDN controllers 186 using logical network configurations corresponding to different types of SDN controllers (e.g., NSX, OpenDaylight (ODL), Open Virtual Network (OVN), and others). Controller driver 190 further includes a driver manager that manages a plurality of different drivers and selects a proper driver to communication with SDN controller 186. The selected driver(s) can implement the proper protocols, which may have different implementations, for communicating with SDN controller 186 and implementing the correct logical network APIs for the SDN controller 186 using these protocols.

Referring again to FIG. 4 in conjunction with FIG. 5, SDN proxy gateway translator 92 of system 72, as included in SDN proxy gateway 88 and executed on computer system/server 12, is configured to transform instructions within the communication 75 sent by SDN controller 86 into translated instructions that hardware gateway 82 can process. To do this, communication translator 92 of SDN proxy gateway 88 converts the instructions, which may be in a proprietary format that is specific to SDN controller 86, into a standardized hardware gateway protocol. To accomplish this, SDN proxy gateway translator can utilize a number of translation tables, which can include the following tables.

| SDN Network table | | | |
|---|---|---|---|
| SDN Port ID | VXLAN VNI ID | Tenant ID | Project ID |

This table records SDN network information. In SDN, this network may use any encapsulation format, such as Geneve, VXLAN, or NVGRE. However, tunneled with Gateway, the network will use VXLAN. "VXLAN VNI ID" is the tunnel for Gateway.

| SDN Port table | | | |
|---|---|---|---|
| SDN Port ID | MAC | IP | Tunnel Endpoint IP |

This table records SDN port information. "Tunnel Endpoint IP" is the IP address of the hypervisor where this port is located.

| SDN Router table | | |
|---|---|---|
| SDN Router ID | Tenant ID | Project ID |

| SDN Router Port table | | | |
|---|---|---|---|
| SDN Router Port ID | SDN Router ID | IP Address | NetMask |

| SDN Static Router Table | | | |
|---|---|---|---|
| SDN Router Route ID | Prefix | Netmask | Nexthop |

| Physical Switch Table | | |
|---|---|---|
| Physical Switch ID | Tunnel Endpoint IP | Management IP |

| Physical Network Table | | |
|---|---|---|
| Physical Network ID | Physical Switch ID | VLAN ID |

| Physical FDB Table | | | |
|---|---|---|---|
| Physical FDB ID | Physical Network ID | VLAN ID | MAC IP |

| VPN Table | | | |
|---|---|---|---|
| VPN ID | Route Distinguisher | Route Target Import | Route Target Export |

| Network Mapping Table | |
|---|---|
| SDN Network ID | Physical Switch ID |

| VPN Mapping Table | | |
|---|---|---|
| VPN ID | Tenant ID | Project ID |

It will be understood that the above tables are for the purpose of example only and are not intended to be limiting. It will further be understood that there are also other tables that could be used including, but not limited to: SDN controller IP, BGP configure, etc. However, these tables are not specifically described herein.

In any case, in order to facilitate the translation, communication translator 192 can include an L2 gateway translator 102 and an L3 gateway translator 112. L2 gateway translator 102 bridges a SDN network with a physical LAN network. To accomplish this, L2 gateway translator needs to communicate with SDN controller MAC/IP of the physical switch in the VLAN domain at the same time it communicates with the physical Gateway SDN port <MAC,IP,VTEP> tuples. Then, the SDN Port <MAC,IP,VTEP> tuples are exchanged to the L2 Gateway. For example, based on the configuration, SDN controller 86 will push information to the SDN Network Table and the SDN Port Table. Then, the SDN proxy gateway 88 will find new information, and will use the new information to construct the SDN Port <MAC,IP,VTEP> tuples into BGP EVPN type 2 routes, or convert to a CLI/SNMP MIB configuration based on the gateway driver. When complete, the BGP EVPN route 2 type route will appear as follows:

| |
|---|
| RD |
| MAC Address |
| IP Address |
| Nexthop |
| VLAN ID |

The RD is obtained by looking up the Tenant ID and Project ID from the SDN Network table based on the Network ID, looking up the VPN ID from the VPN Mapping table based on the Tenant ID and project ID, and looking up the RD from the VPN table based on the VPN ID. The MAC address/IP/Nexthop is obtained from the SDN port <MAC, IP,VTEP>. The VLAN ID is obtained by looking up the Physical Network ID from the Network Mapping table based on the Network ID and looking up the VLAN ID from the Physical Network table based on the Physical Network ID.

In contrast, L3 gateway translator 112 provides routing between subnets in the SDN network and subnets in the physical LAN network. To accomplish this, L3 gateway translator 112 must transfer the SDN Router Port <Subnet, Mask> pair to the L3 Gateway. Based on the configuration, SDN controller 186 will push router information which needs to be advertised to the SDN Router Table and SDN Router Port Table. SDN proxy gateway will retrieve the new information, and then it will construct the SDN Router Port into BGP EVPN type 5 routes or convert the SDN Router Port to a CLI/SNMP MIB configuration based on the gateway driver. The BGP EVPN route 5 type route will appear as follows:

| |
|---|
| RD |
| Netmask |
| IP Prefix |
| Nexthop |

RD is obtained as follows: the Tenant ID and Project ID are retrieved from the SDN Router table based on the router ID; the VPN ID is retrieved from the VPN Mapping table based on the Tenant ID and project ID; and RD is retrieved from the VPN table based on VPN ID. The Netmask and IP prefix is obtained from the SDN Router Port pair <Subnet, Mask>. Nexthop is the Router Port IP which is connected to hardware gateway 182.

SDN gateway driver 94 of system 72, as included in SDN proxy gateway 88 and executed by computer system/server 12, is configured to push 76 the translated instructions for establishing the connection to network 50 to hardware gateway 82. Once SDN proxy gateway 88 has translated these instructions into a format that is familiar to hardware gateway 82, the format of the initial communication 75 from SDN controller 86 has no bearing. Further, SDN proxy gateway 88 can facilitate connection requests from multiple SDN controllers 86 of different types using the same hardware gateway 82. To this extent, gateway driver 94 has a set of physical network APIs for physical network configurations corresponding to different types of hardware gateways. Further, gateway driver 94 has a hardware driver manager that manages a plurality of different hardware drivers and selects a proper hardware driver to communicate with the hardware gateway.

Once the translated instructions have been received by hardware gateway 82 from SDN gateway driver 94, hardware gateway 82 can send responsive communications back to SDN controller 86 using the same pathways. For example, SDN gateway driver 94 can process such a responsive communication from hardware gateway 82, which would be in the protocol native to the gateway. SDN proxy gateway translator 92 translates the responsive communication into the format that is native to SDN controller 86, and SDN controller driver pushes the translated responsive communication to the SDN controller. The data flow in this specification has been described in terms of an initial communication from SDN controller 86 through SDN proxy gateway 88 to hardware gateway 82 and a responsive communication, if any, in the opposite direction. It should, however, be understood that the described invention would also function in the case of an initial communication from hardware gateway 82 through SDN proxy gateway 88 to SDN controller 86 and a responsive communication, if any, in the opposite direction.

To this extent, the instructions included in these initial communications and responsive communications provide the information needed for a connection to be established to the network 50. For example, in response to the receipt of the translated instructions pushed 76 by SDN gateway driver 94, a direct data path 78 can be built from hardware gateway 82 to hypervisor 81 on which computing node 84N is running. In an embodiment, direct data path 78 can be a Virtual eXtensible Local Area Network (VXLAN) tunnel. This can be accomplished in one or more of several different ways.

For an L2 connection, hardware gateway 182 from the FDB table must be provided to SDN controller 186. Once hardware gateway 182 obtains a new MAC/IP in the FDB table, it will send a BGP EVPN type 2 route. Alternatively, the hardware gateway 182 can wait for SDN proxy gateway 188 to use CLI or SNMP to get a MAC/IP information. After the BGP EVPN type 2 route is received, hardware gateway 182 will look up the Physical Network ID from the Physical Network Table based on the VLAN ID, and then push type 2 routes information into the Physical FDB table. Finally, SDN controller 186 will be provided the new information Physical FDB table.

For an L3 connection, the gateway routing table is transferred to SDN controller 186 as follows. Once a gateway has found a new route in the routing table, it will send a BGP EVPN type 5 route. After the BGP EVPN type 5 route is received, the gateway will retrieve the VPN ID from the VPN Table based on RD. Then the Tenant ID and Project ID are retrieved from the VPN Mapping table. All SDN Router IDs are retrieved from the SDN Router table based on tenant ID and project ID. The type 5 route is converted into the SDN Router Static Table. Finally, SDN controller 186 is sent the new information in the SDN Router Static Table.

Figure 6:
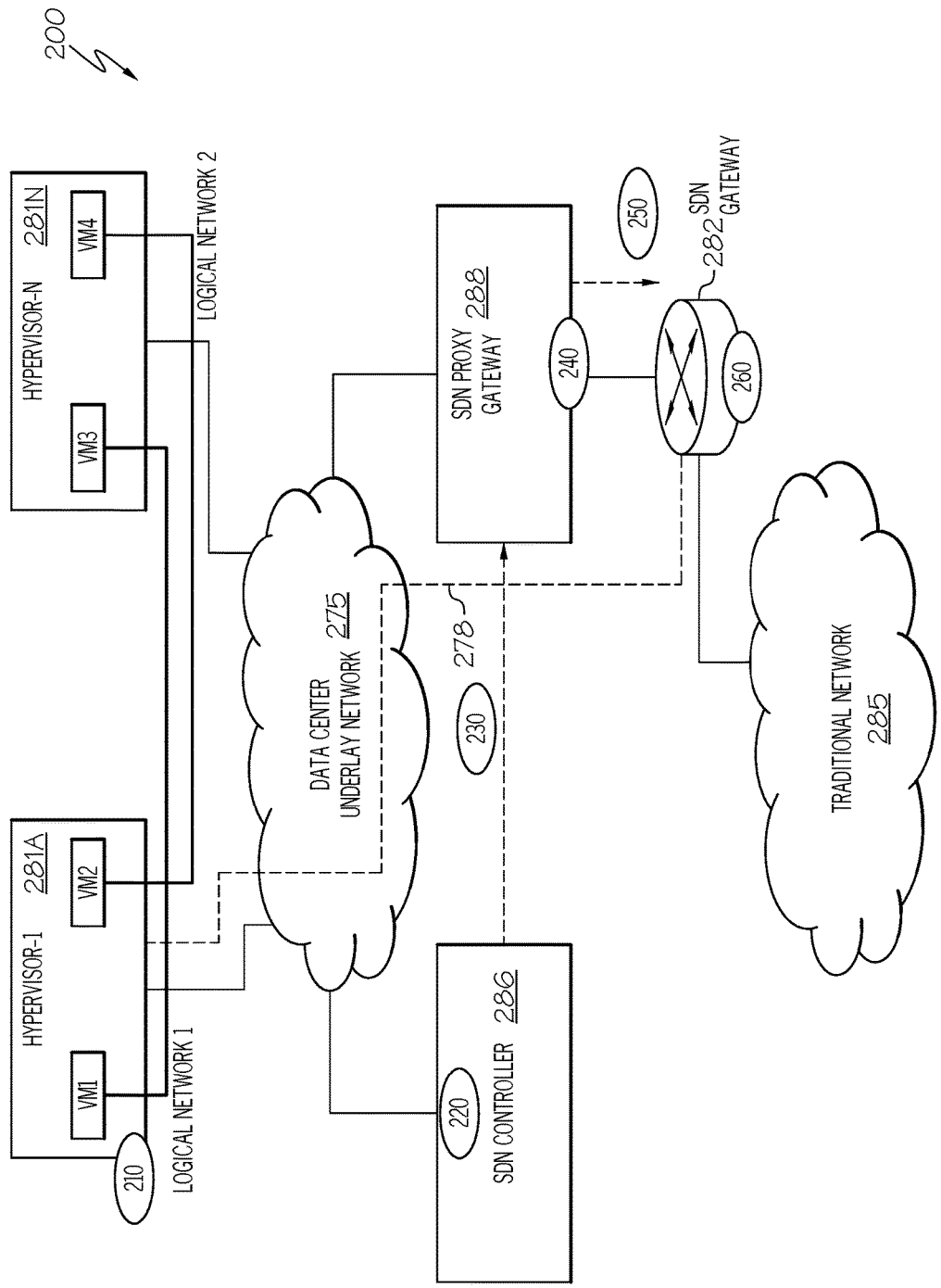
FIG. 6 depicts an example data flow diagram according to an embodiment of the present invention.

Referring now to FIG. 6, a data flow diagram 200 according to an embodiment of the present invention is shown. In the figure, the flow begins at 210, when a component (e.g., VM1) boots up within hypervisor-1 281A. For the purpose of this example, suppose that for IP1, MAC1 hypervisor IP is VTEP1 and VM is network NET-1. In 220, SDN controller 286 detects the boot-up even and at 230 sends the information: (MAC1, IP1) of NET-1 on VTEP1 to SDN proxy gateway 288, e.g., through data center underlay network 275. SDN controller 286 may also send the information to all other hypervisors 281N. After receiving the information from SDN controller 286, at 240 SDN proxy gateway 288 translates the received information into a new format that is appropriate for SDN hardware gateway 282. At 250, SDN proxy gateway 288 sends the newly formatted information to SDN hardware gateway 282. After receiving the newly formatted information, at 260 SDN hardware gateway 282 builds a VXLAN tunnel 278 to hypervisor-1 281A and updates the local forwarding table. This last process may be performed without the help or knowledge of SDN hardware gateway 282.

Figure 7:
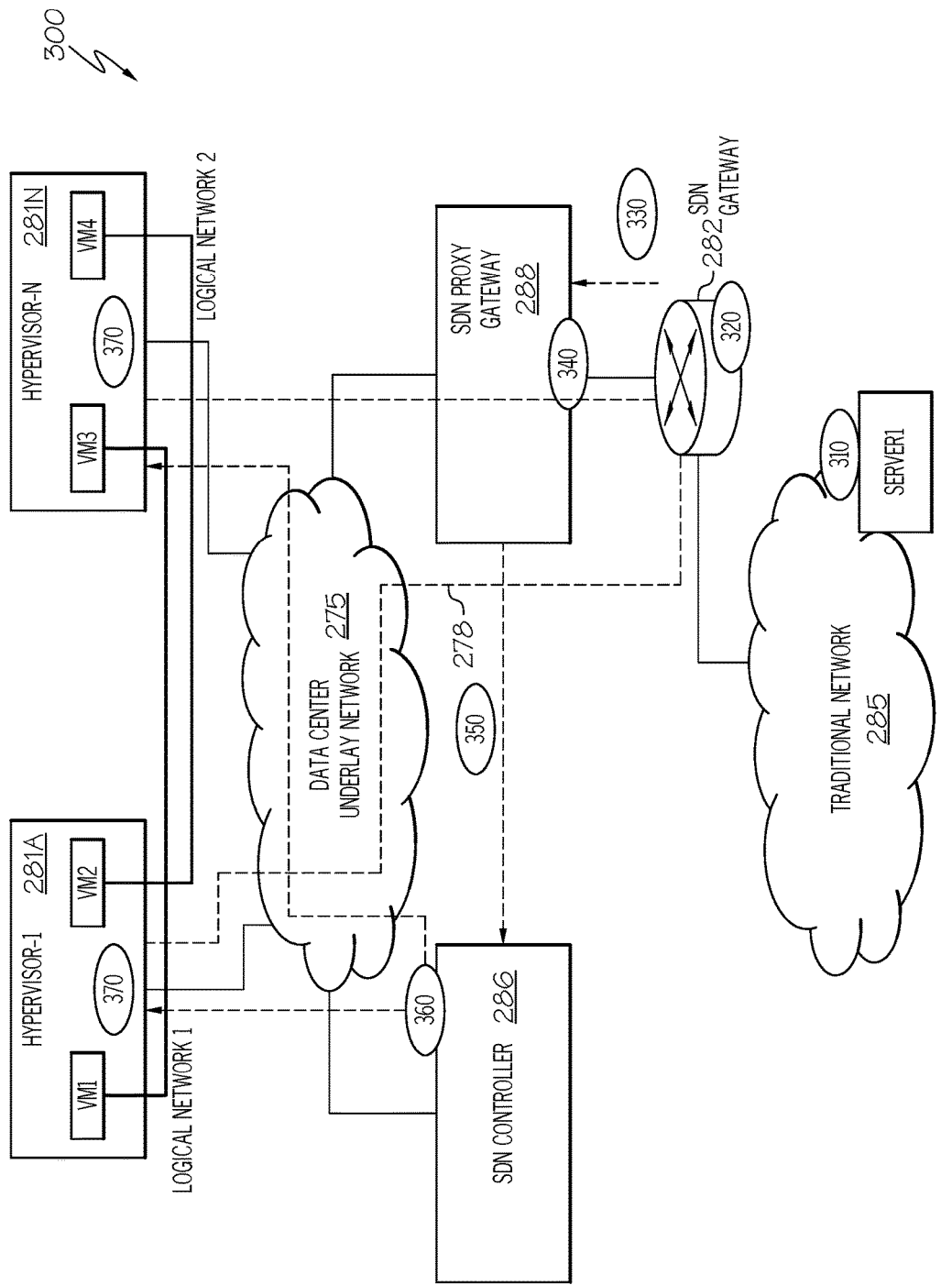
FIG. 7 depicts an example data flow diagram according to an embodiment of the present invention.

Referring now to FIG. 7, a data flow diagram 400 according to an embodiment of the present invention is shown. At 310, a new server is added to (e.g., is brought online on) traditional network 285. This new server is detected at 320 by SDN gateway 282, and, for the purpose of this example, has the identifier (MAX2, IP2) in VLAN x. SDN gateway 282 sends this information at 330 to SDN proxy gateway 288 (including (MAC2, IP2, VLAN x, SDN Gateway VTEP IP2) in a standard format of SDN gateway 282 (e.g., BGP format). At 340, SDN proxy gateway 288 will translate the information into a format that is native to SDN controller 286 (e.g., openflow, OVSDB, etc.). SDN proxy gateway 288 will then send the translated information to SDN controller 286 in 350. SDN controller 286, in 360, will forward this translated information to all hypervisors 281A-N, and in 370 one or more hypervisors 281A-N will build VXLAN tunnel 278 to SDN gateway 282 if necessary.

Figure 8:
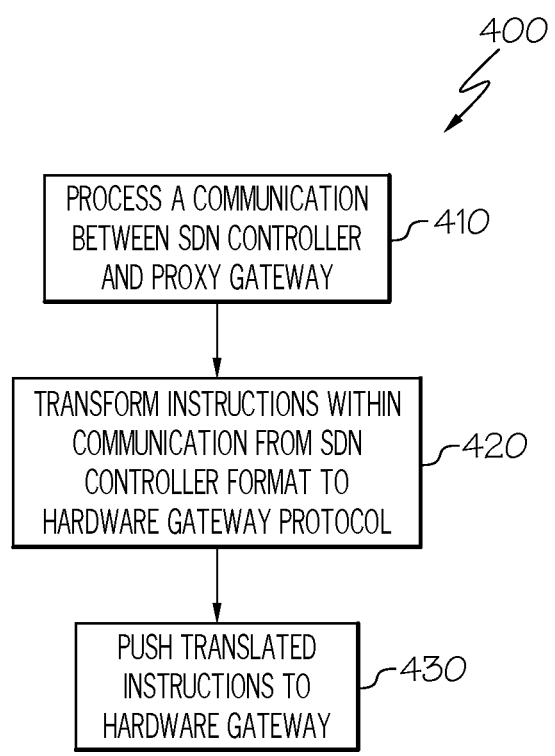
FIG. 8 depicts an example process flowchart according to an embodiment of the present invention.

Referring now to FIG. 8 in conjunction with FIG. 4, a process flowchart 400 according to an embodiment of the present invention is shown. At 410, SDN controller driver 90 of system 72, as included in SDN proxy gateway and executed by computer system/server 12, processes a communication 75 between SDN controller 86 and hardware gateway 82. This communication 75 includes a request 74 from computing node 84N of plurality of computing nodes 84A-N on server computer system 80 to establish a connection to network 50. At 420, SDN proxy gateway translator 92, as included in SDN proxy gateway and executed by computer system/server 12, transforms instructions within communication 75 that are in a first format of SDN controller 86 into translated instructions in a standardized hardware gateway protocol. At 430, SDN gateway driver 94, as included in SDN proxy gateway and executed by computer system/server 12, pushes 76 the translated instructions for establishing the connection to network 50 to hardware gateway 82.

The process flowchart of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for establishing a software-defined networking (SDN) communication in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for facilitating a SDN communication. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for establishing a SDN communication in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for establishing a software-defined networking (SDN) communication in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A software-defined networking (SDN) communication system, comprising:
   a server computer system in a networked computing environment;
   a plurality of computing nodes operating within the server system;
   a hardware gateway that connects the server computer system to a network,
   a SDN controller; and
   a SDN proxy gateway operating outside of an operation of the SDN controller and being an intermediary between the hardware gateway and the SDN controller, the SDN proxy gateway having:
      a SDN controller driver that processes a communication between the SDN controller and the hardware gateway using a set of application programmer interfaces (APIs) that includes a plurality of APIs corresponding to each of plurality of different types of SDN controllers, the communication including a request from a computing node of the plurality of computing nodes to establish a connection to the network;
      a SDN proxy gateway translator that transforms instructions within the communication that are in a first format of the SDN controller into translated instructions in a standardized hardware gateway protocol; and
      a SDN gateway driver that pushes the translated instructions for establishing the connection to the network to the hardware gateway.

2. The system of claim 1, wherein the instructions include logical network information and endpoint information.

3. The system of claim 1, the controller driver further comprising:
   a driver manager that manages a plurality of different drivers and selects a proper driver to process the incoming communication from the SDN controller.

4. The system of claim 1, the SDN proxy gateway translator further comprising:
   a layer 2 gateway translator that bridges a SDN network with a physical LAN network; and a layer 3 gateway translator that provides routing between subnets in the SDN network and subnets in the physical LAN network.

5. The system of claim 1, the gateway driver further comprising:
   a set of physical network APIs for physical network configurations corresponding to different types of hardware gateways; and
   a hardware driver manager that manages a plurality of different hardware drivers and selects a proper hardware driver to communicate with the hardware gateway.

6. The system of claim 1, further comprising a connection establisher that establishes, in response to the receipt of the translated instructions, the connection to the network by building a direct data path from the hardware gateway to a hypervisor on which the computing node is running, wherein the direct data path is a Virtual eXtensible Local Area Network (VXLAN) tunnel.

7. The system of claim 1, wherein the networked computing environment is a cloud computing environment, wherein the SDN proxy gateway is a stand-alone utility included within a hypervisor in the cloud computing environment, and wherein the computing node is a cloud resource selected from a group, comprising: a virtual machine instance and a container virtual machine.

8. A method for establishing a software-defined networking (SDN) connection to a network in a networked computing environment, comprising:
   processing a communication between a SDN controller and a hardware gateway using a set of application programmer interfaces (APIs) that includes a plurality of APIs corresponding to each of plurality of different types of SDN controllers on a SDN proxy gateway that operates outside of an operation of the SDN controller and is an intermediary between the hardware gateway and the SDN controller, the communication including a request from a computing node of a plurality of computing nodes on a server computer system to establish a connection to the network;
   transforming, by the SDN proxy gateway, instructions within the communication that are in a first format of the SDN controller into translated instructions in a standardized hardware gateway protocol; and
   pushing, by the SDN proxy gateway, the translated instructions for establishing the connection to the network to the hardware gateway.

9. The method of claim 8, wherein the instructions include logical network information and endpoint information.

10. The method of claim 8, the processing further comprising:
    managing a plurality of different drivers corresponding to the different types of SDN controllers; and
    selecting, from the plurality of different drivers, a proper driver to process the incoming communication from the SDN controller.

11. The method of claim 8, wherein the translated instructions include:
    a set of layer 2 gateway translations that bridge a SDN network with a physical LAN network; and
    a set of layer 3 gateway translations that provide routing between subnets in the SDN network and subnets in the physical LAN network.

12. The method of claim 8, the pushing further comprising:
    providing a set of physical application programmer interfaces (APIs) for physical network configurations corresponding to different types of hardware gateways;
    managing a plurality of different hardware drivers corresponding to the different types of hardware gateways; and
    selecting, from the plurality of different hardware drivers, a proper hardware driver to communicate with the hardware gateway.

13. The method of claim 8, further comprising establishing, in response to the receipt of the translated instructions, the connection to the network by building a direct data path from the hardware gateway to a hypervisor on which the computing node is running, wherein the direct data path is a Virtual eXtensible Local Area Network (VXLAN) tunnel.

14. The method of claim 8, wherein the networked computing environment is a cloud computing environment, wherein the SDN proxy gateway is a stand-alone utility included within a hypervisor in the cloud computing environment, and wherein the computing node is a cloud resource selected from a group, comprising: a virtual machine instance and a container virtual machine.

15. A computer program product embodied in a computer readable storage medium that, when executed by a computer device, performs a method for establishing a software-defined networking (SDN) connection to a network in a networked computing environment, the method comprising:
    processing a communication between a SDN controller and a hardware gateway using a set of application programmer interfaces (APIs) that includes a plurality of APIs corresponding to each of plurality of different types of SDN controllers on a SDN proxy gateway that operates outside of an operation of the SDN controller and is an intermediary between the hardware gateway and the SDN controller, the communication including a request from a computing node of a plurality of computing nodes on a server computer system to establish a connection to the network;
    transforming, by the SDN proxy gateway, instructions within the communication that are in a first format of the SDN controller into translated instructions in a standardized hardware gateway protocol; and
    pushing, by the SDN proxy gateway, the translated instructions for establishing the connection to the network to the hardware gateway.

16. The program product of claim 15, the processing further comprising:
    providing a set of logical application programmer interfaces (APIs) for logical network configurations corresponding to different types of SDN controllers;
    managing a plurality of different drivers corresponding to the different types of SDN controllers; and
    selecting, from the plurality of different drivers, a proper driver to process the incoming communication from the SDN controller.

17. The program product of claim 15, wherein the translated instructions include:
    a set of layer 2 gateway translations that bridge a SDN network with a physical LAN network; and
    a set of layer 3 gateway translations that provide routing between subnets in the SDN network and subnets in the physical LAN network.

18. The program product of claim 15 the pushing further comprising:
    providing a set of physical application programmer interfaces (APIs) for physical network configurations corresponding to different types of hardware gateways;

managing a plurality of different hardware drivers corresponding to the different types of hardware gateways; and selecting, from the plurality of different hardware drivers, a proper hardware driver to communicate with the hardware gateway.

19. The program product of claim 15, the method further comprising establishing, in response to the receipt of the translated instructions, the connection to the network by building a direct data path from the hardware gateway to a hypervisor on which the computing node is running, wherein the direct data path is a Virtual eXtensible Local Area Network (VXLAN) tunnel.

20. The program product of claim 15, wherein the networked computing environment is a cloud computing environment, wherein the SDN proxy gateway is a stand-alone utility included within a hypervisor in the cloud computing environment, and wherein the computing node is a cloud resource selected from a group, comprising: a virtual machine instance and a container virtual machine.

\* \* \* \* \*